(12) United States Patent  
Iwashita et al.

(10) Patent No.: US 8,242,734 B2
(45) Date of Patent: Aug. 14, 2012

(54) CONTROLLER OF SPINDLE PROVIDED WITH ENCODER

(75) Inventors: Yasusuke Iwashita, Minamitsuru-gun (JP); Tadashi Okita, Minamitsuru-gun (JP); Takahiro Akiyama, Minamitsuru-gun (JP); Geng Li, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/030,252

(22) Filed: Feb. 18, 2011

(65) Prior Publication Data

US 2011/0234146 A1  Sep. 29, 2011

(30) Foreign Application Priority Data

Mar. 26, 2010 (JP) ................................. 2010-073096

(51) Int. Cl.
*H02P 23/00* (2006.01)
(52) U.S. Cl. ......... 318/799; 318/798; 318/767; 318/727
(58) Field of Classification Search .................. 318/799, 318/798, 767, 727
See application file for complete search history.

(56) References Cited

U.S. PATENT DOCUMENTS 5,153,491 A * 10/1992 Fujioka et al. ................ 318/578
6,708,134 B2 * 3/2004 McGaughey et al. ......... 702/145

FOREIGN PATENT DOCUMENTS

| JP | 2002-51594 | | 2/2002 |
| JP | 2007-105809 | A | 4/2007 |
| JP | 2010-52009 | A | 3/2010 |

* cited by examiner

*Primary Examiner* — Walter Benson
*Assistant Examiner* — David Luo
(74) *Attorney, Agent, or Firm* — Drinker Biddle & Reath LLP

(57) ABSTRACT

The controller controls a spindle connected to an induction motor via a belt by controlling the rotational velocity of the induction motor. The spindle has an encoder attached thereto for detecting the position of the spindle, but the induction motor does not have a velocity detector attached thereto. The velocity of the induction motor is estimated from the spindle velocity obtained from output of the encoder, and slip of the belt is detected based on the estimated velocity of the induction motor. When occurrence of slip of the belt is detected, the estimated velocity of the induction motor will not be used for the control of the induction motor.

6 Claims, 18 Drawing Sheets

CONTROLLER OF SPINDLE PROVIDED WITH ENCODER

RELATED APPLICATION DATA

This application claims priority under 35 U.S.C. §119 and/or §365 to Japanese Application No. 2010-073096 filed Mar. 26, 2010, the entire contents of which are incorporated herein by reference.

BACKGROUND OF THE INVENTION

1. Field of the Invention

The present invention relates to a controller for controlling a spindle of a machine tool that is driven by an induction motor via a belt by controlling the rotational velocity of the induction motor. More particularly, the present invention relates to a controller of a spindle which is adapted to be capable of controlling the spindle with an encoder attached to the spindle for detecting the position of the spindle and without a velocity detector attached to the induction motor.

2. Description of the Related Art

FIG. 15 is a schematic block diagram illustrating a spindle to which an induction motor having no velocity detection sensor attached thereto (sensorless) is applied.

A sensorless induction motor 2 transmits its driving force to a spindle 6 of a lathe or the like via a reduction mechanism 4 including a belt. An encoder 8 that outputs a feedback pulse Pfb for detecting the rotational position of the spindle 6 is attached to the spindle 6. The feedback pulse Pfb output from the encoder 8 attached to the spindle 6 is used for control of the rotational position of the spindle 6 to achieve a function such as a function of halting the spindle at a fixed position.

In a subtractor 10, the velocity of the sensorless induction motor 2 estimated by a velocity estimator 15 is subtracted from a velocity command Vcmd output from a host controller (not shown) to determine velocity deviation. A velocity control unit 11 performs PI control (proportional-plus-integral control) on the velocity deviation to determine a torque current command. A current control unit 12 determines a voltage command by using the determined torque current command and an actual current Ire flowing through the induction motor 2 detected by a current detector 14, and outputs the determined voltage command to a power amplifier 13 comprising an inverter. The velocity estimator 15 estimates the rotational velocity of the induction motor 2 by using the actual current Ire flowing through the induction motor 2 detected by the current detector 14 to determine an estimated velocity Vest.

FIG. 16 is a schematic block diagram illustrating a spindle to which the sensorless induction motor is applied and for which the feedback pulse from the encoder is utilized also for motor velocity control.

The feedback pulse Pfb output from the encoder 8 is used not only for control of the rotational position of the spindle 6 but also for calculation of the estimated velocity in the velocity estimator 15.

FIG. 17 is a schematic block diagram illustrating a spindle to which the sensorless induction motor is applied and for which the feedback pulse from the encoder is utilized also for current control.

The feedback pulse output from the encoder 8 is used not only for control of the rotational position of the spindle 6 but also for calculation of the voltage command in the current control unit 12.

In motor control of a general sensorless induction motor 2, as described above referring to FIGS. 15 to 17, the velocity of the motor is determined by estimated calculation performed in software based on the actual current Ire flowing through the induction motor 2, and calculation of the torque command and determination of current phases to be applied to each winding of the motor are performed based on this estimated velocity Vest.

When this sensorless motor is applied to a spindle of a lathe as a machine tool, the encoder 8 for detecting the rotational position of the spindle is mounted on the spindle. In this regard, Japanese Patent Application Laid-Open No. 2002-51594 discloses a technique to achieve higher controllability for simple sensorless control by substituting the feedback pulse Pfb of the encoder 8 for motor velocity feedback or by using the feedback pulse Pfb of the encoder 8 for correction on the estimated velocity Vest of the induction motor 2, for correction of an excitation frequency command or for processing such as clamp.

Generally, a machine tool such as a lathe drives its spindle by means of the induction motor 2 via a reduction mechanism including a belt between the induction motor 2 and the spindle, and slip of the belt may occur when sudden and large cutting force acts. Since the position of the spindle is detected by the encoder 8 attached to the spindle, the slip does not affect the accuracy of the positioning of the spindle, if any.

However, when the velocity (rotational velocity) of the encoder attached to the spindle is used for motor velocity control (see FIG. 16) or current control (see FIG. 17), the torque command may be suddenly changed to generate large shock and prevent the current phase control from being performed correctly, activating an alarm for warning of overcurrent (see FIG. 19). This is because the motor velocity converted from the encoder velocity suddenly changes in the case of the slip as illustrated in FIGS. 18A and 18B.

SUMMARY OF THE INVENTION

In view of the above-described disadvantage of the related art, therefore, it is an object of the present invention to provide a controller of a spindle provided with an encoder for detecting the position of the spindle, the spindle being driven via a belt by an induction motor not having a velocity detector, wherein slip of the belt is detected, and when the slip of the belt occurs, usage of an estimated velocity of the motor obtained based on signals from the encoder is temporarily halted to avoid vibration and generation of overcurrent.

The present invention is directed to a controller for controlling a spindle connected to an induction motor via a belt by controlling the rotational velocity of the induction motor, and the spindle has an encoder attached thereto for detecting the position of the spindle. The controller comprises a spindle velocity detecting unit for detecting a spindle velocity from the number of feedback pulses of the encoder within a predetermined period of time; a first motor velocity estimating unit for obtaining a first estimated motor velocity of the induction motor from the spindle velocity detected by the spindle velocity detecting unit and a reduction ratio between the spindle and the induction motor; a motor velocity control unit for controlling the induction motor based on a velocity command given to the induction motor and the first estimated motor velocity obtained by the first motor velocity estimating unit; a slip detecting unit for detecting occurrence of slip of the belt based on the first estimated motor velocity obtained by the first motor velocity estimating unit or the spindle velocity detected by the spindle velocity detecting unit; and a switch unit for controlling input of the first estimated motor velocity to the motor velocity control unit based on a result of the belt slip detection from the slip detecting unit. The switch unit is controlled so that the first estimated motor velocity will not be used for the control of the induction motor when slip of the belt is detected by the slip detecting unit.

The slip detecting unit may be adapted to recognize occurrence of slip of the belt when the change of the first estimated motor velocity obtained by the first motor velocity estimating unit exceeds a first predetermined value or when the change of the spindle velocity detected by the spindle velocity detecting unit exceeds a value corresponding to the first predetermined value.

The controller may further include a second motor velocity estimating unit for calculating a second estimated motor velocity from the velocity command of the induction motor and a motor current flowing through the induction motor so that the slip detecting unit recognizes occurrence of slip of the belt when the difference between the first estimated motor velocity and the second estimated motor velocity exceeds a second predetermined value.

The controller may further include a second motor velocity estimating unit for calculating a second estimated motor velocity from the velocity command of the induction motor and a motor current flowing through the induction motor so that the slip detecting unit may recognize occurrence of slip of the belt when the change of the difference between the first estimated motor velocity and the second estimated motor velocity exceeds a third predetermined value.

The controller may further include a second motor velocity estimating unit for calculating a second estimated motor velocity from the velocity command of the induction motor and a motor current flowing through the induction motor so that the slip detecting unit may recognize occurrence of slip of the belt when the ratio between the second estimated motor velocity and the first estimated motor velocity exceeds a forth predetermined value.

The slip detecting unit may include decision means for deciding whether or not slip occurred within a past predetermined period of time to control the switch unit so that the first estimated motor velocity will not be used for the control of the induction motor when the decision means decides that slip occurred within the past predetermined period of time even if the slip detecting unit does not detect occurrence of slip.

The present invention can provide a controller of a spindle provided with an encoder for detecting the position of the spindle, the spindle being driven via a belt by an induction motor not having a velocity detector, wherein slip of the belt is detected, and when the slip of the belt occurs, usage of an estimated velocity of the motor obtained based on signals from the encoder is temporarily halted to avoid vibration and generation of overcurrent.

BRIEF DESCRIPTION OF THE DRAWINGS

The aforementioned and other objects and features of the present invention will be apparent from the following description of embodiments with reference to the accompanying drawings in which.

DETAILED DESCRIPTION OF THE PREFERRED EMBODIMENTS

Figure 1:
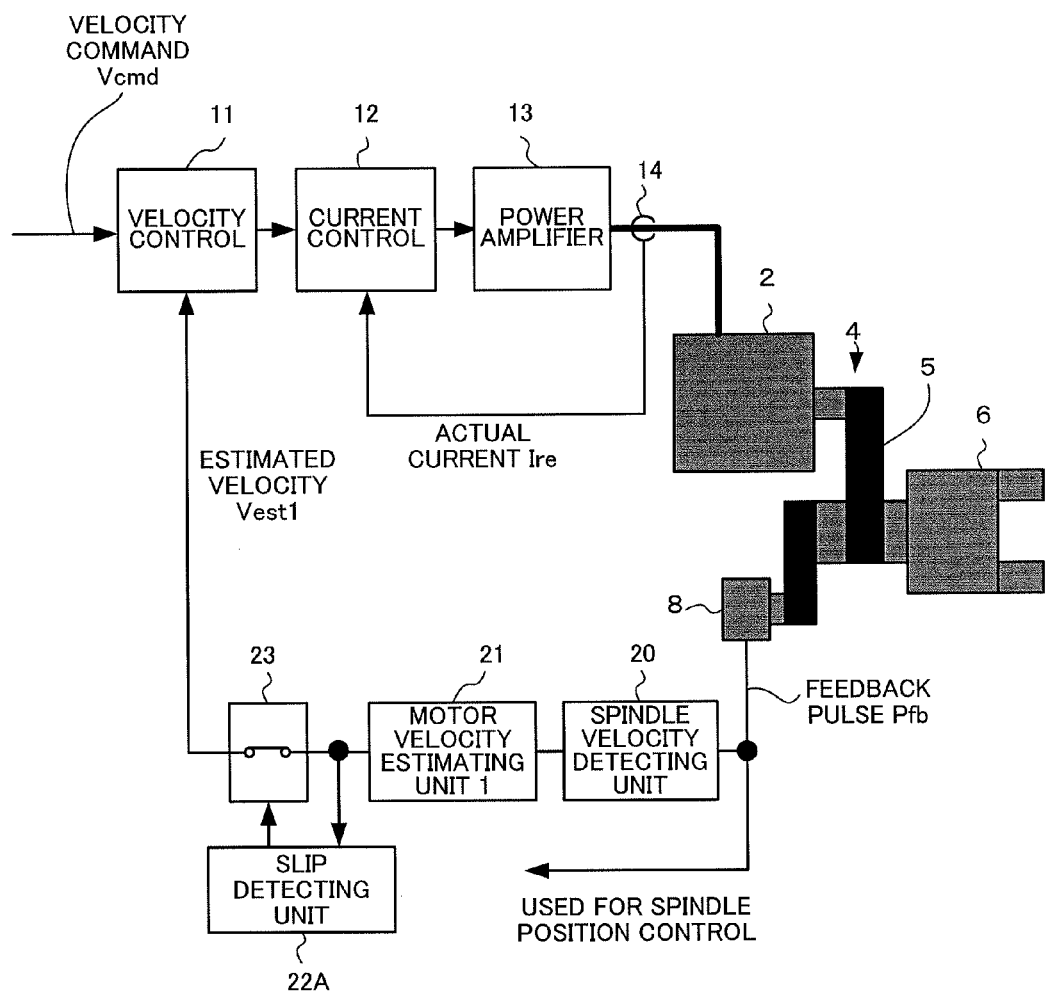
FIG. 1 is a drawing illustrating a first embodiment of a controller of a spindle according to the present invention.

A first embodiment of a controller of a spindle according to the present invention will be described with reference to FIG. 1.

An induction motor 2 is an induction motor provided with no velocity detection sensor, that is, a sensorless induction motor. The driving force of the induction motor 2 is transmitted to a spindle 6 of a lathe or the like via a reduction mechanism 4 including a belt 5 and gears (not shown). An encoder 8 that outputs a feedback pulse Pfb for detecting the rotational position of the spindle is attached to the spindle 6. The feedback pulse Pfb output from the encoder 8 is used for control of the rotational position of the spindle to achieve a function such as a function of halting the spindle at a fixed position.

A velocity control unit 11 performs PI control (proportional-plus-integral control) by using a velocity command Vcmd output by a host controller (not shown) and an estimated velocity Vest1 of the sensorless induction motor 2 estimated by a motor velocity estimating unit 21 to determine a torque current command. A current control unit 12 determines a voltage command by using the determined torque current command and an actual current Ire flowing through the induction motor 2 detected by a current detector 14, and outputs the determined voltage command to a power amplifier 13.

A spindle velocity detecting unit 20 detects the rotational velocity (spindle velocity) of the spindle 6 by using the feedback pulse Pfb from the encoder 8. Specifically, the spindle velocity of the spindle 6 can be calculated by counting the number of pulses per unit time.

The motor velocity estimating unit 21 determines the velocity of the induction motor 2 from the spindle velocity determined by the spindle velocity detecting unit 20. Since the power is transmitted from the induction motor 2 to the spindle 6 via the reduction mechanism 4 including the belt 5, the motor velocity estimating unit 21 can determine the estimated velocity Vest1 of the induction motor 2 by taking into consideration the reduction ratio in addition to the spindle velocity determined by the spindle velocity detecting unit 20.

A slip detecting unit 22A of this embodiment (first slip detecting unit) decides presence or absence of slip by deciding whether or not the estimated velocity Vest1 of the induction motor 2 estimated by the first motor velocity estimating unit 21 is larger than a predetermined value (first threshold). Then, a switch unit 23 is controlled based on the result of the decision by the first slip detecting unit 22A to switch input of the estimated velocity Vest1 from the first motor velocity estimating unit 21 to the velocity control unit 11 on and off.

An algorithm of the control by the controller illustrated in FIG. 1 will be described with reference to the flow chart of FIG. 2. The processing illustrated in this flow chart is performed every control cycle. The algorithm will be described according to respective steps as follows.

[Step SA1] The encoder (spindle) velocity is acquired. Specifically, the spindle velocity is acquired by counting the number of feedback pulses per control cycle.

[Step SA2] The first estimated velocity of the induction motor is calculated from the encoder (spindle) velocity acquired in Step SA1 by using the following formula:

First estimated velocity Vest1 of induction motor=encoder velocity×(reduction ratio between spindle and motor)

The reduction ratio between the spindle and the motor in the formula is stored in the controller as a parameter in advance.

[Step SA3] The first estimated velocity Vest1 of the induction motor calculated in Step SA2 is compared with a predetermined value (first threshold).

[Step SA4] As a result of the comparison in Step SA3, for example, when the first estimated velocity Vest1 is not equal to or below the first threshold, it is decided that the belt has not slipped, and the algorithm goes to Step SA5. On the other hand, when the first estimated velocity Vest1 is equal to or below the first threshold, it is decided that the belt has slipped and the algorithm goes to Step SA6.

[Step SA5] The first estimated velocity Vest1 of the induction motor calculated in Step SA2 is used for the control, and the processing in the present control cycle is completed.

[Step SA6] The first estimated velocity Vest1 of the induction motor calculated in Step SA2 is not used for the control, and the processing in the present control cycle is completed.

Figure 3:
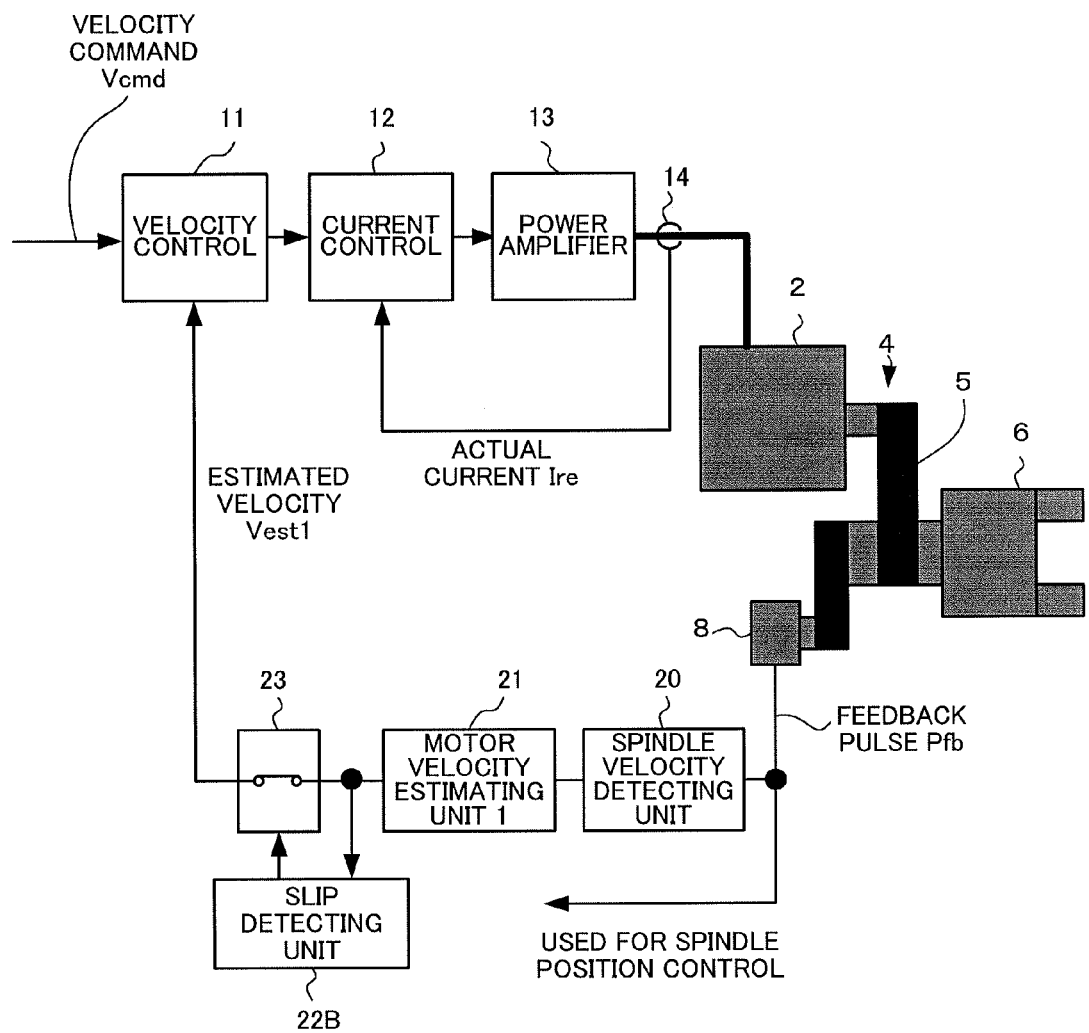
FIG. 3 is a drawing illustrating a second embodiment of the controller of a spindle according to the present invention.

A second embodiment of the controller of a spindle according to the present invention will be described with reference to FIG. 3.

A slip detecting unit 22B of this embodiment (second slip detecting unit) decides presence or absence of slip by deciding whether or not the absolute value of the change of the estimated velocity Vest of the induction motor 2 estimated by the first motor velocity estimating unit 21 is larger than a predetermined value (second threshold). The switch unit 23 is controlled based on the result of the decision by the second slip detecting unit 22B to switch input of the estimated velocity Vest1 to the velocity control unit 11 on and off.

Figure 4:
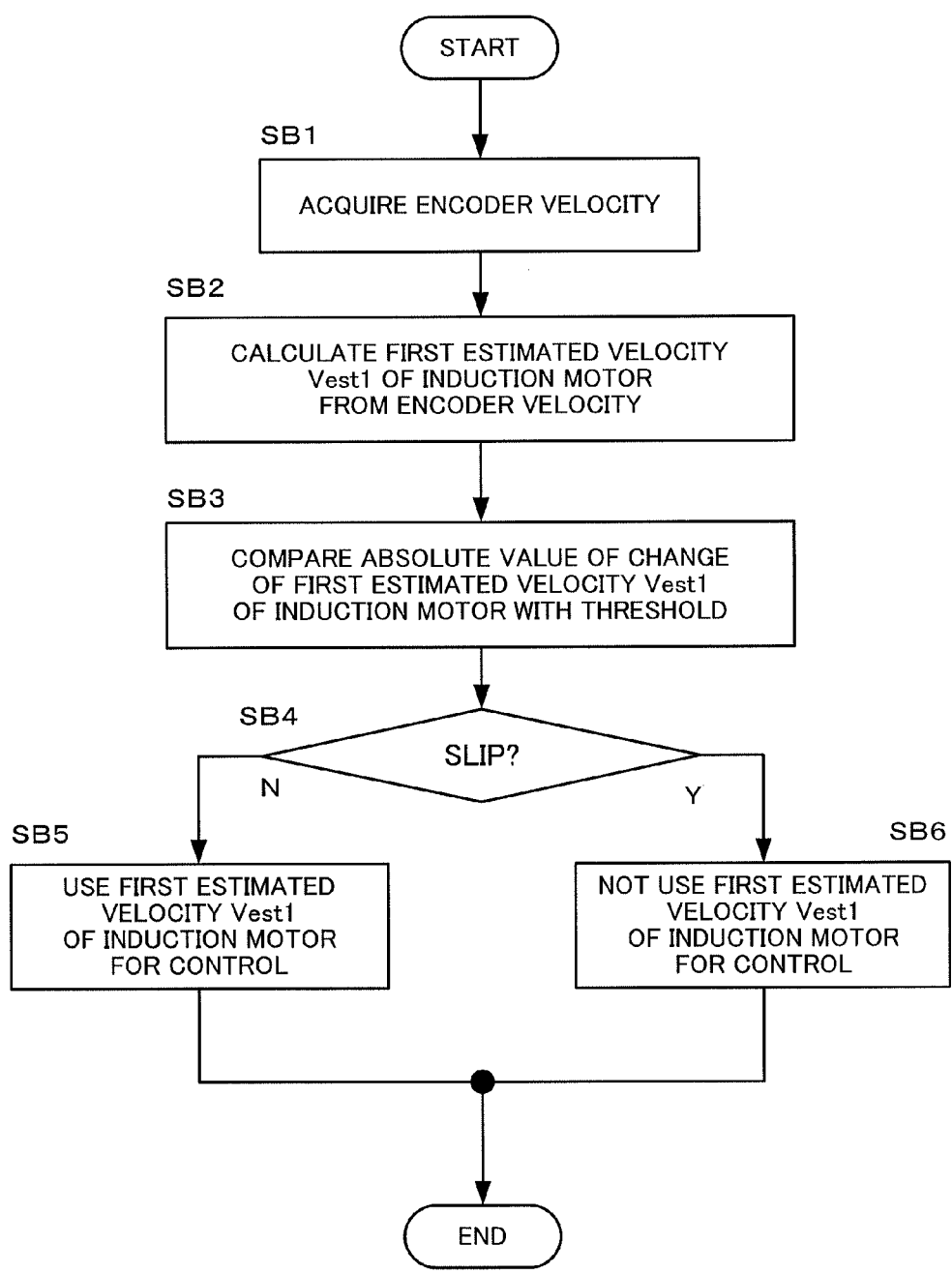
FIG. 4 is a flow chart illustrating an algorithm of control by the controller illustrated in FIG. 3.

An algorithm of the control by the controller illustrated in FIG. 3 will be described with reference to the flow chart of FIG. 4. The processing illustrated in this flow chart is performed every control cycle. The algorithm will be described according to respective steps as follows.

[Step SB1] The encoder (spindle) velocity is acquired. Specifically, the spindle velocity is acquired by counting the number of feedback pulses per control cycle.

[Step SB2] The first estimated velocity of the induction motor is calculated from the encoder (spindle) velocity acquired in Step SB1 by using the following formula:

First estimated velocity Vest1 of induction motor=encoder velocity×(reduction ratio between spindle and motor)

The reduction ratio between the spindle and the motor in the formula is stored in the controller as a parameter in advance.

[Step SB3] The absolute value of the change of the first estimated velocity Vest1 of the induction motor calculated in Step SB2 is compared with a predetermined value (second threshold). Here, the change of the first estimated velocity Vest1 can be calculated by, for example, determining the difference between the first estimated velocity Vest1 of the induction motor in the previous control cycle and the first estimated velocity Vest1 of the induction motor in the present control cycle.

[Step SB4] As a result of the comparison in Step SB3, when the absolute value of the change of the first estimated velocity Vest1 is not larger than the second threshold, it is decided that the belt has not slipped, and the algorithm goes to Step SB5. On the other hand, when the absolute value of the change of the first estimated velocity Vest1 is larger than the second threshold, it is decided that the belt has slipped and the algorithm goes to Step SB6.

[Step SB5] The first estimated velocity Vest1 of the induction motor calculated in Step SB2 is used for the control, and the processing in the present control cycle is completed.

[Step SB6] The first estimated velocity Vest1 of the induction motor calculated in Step SB2 is not used for the control, and the processing in the present control cycle is completed.

In the first embodiment (FIG. 1) and the second embodiment (FIG. 3), the slip detecting units 22A, 22B receive the estimated velocity Vest1 from the motor velocity estimating unit 21 to detect occurrence of slip. Instead, however, the slip detecting units 22A, 22B may receive the spindle velocity (encoder velocity) output from the spindle velocity detecting unit 20 to detect occurrence of slip. In this case, the first threshold and the second threshold are converted into a value corresponding to the spindle velocity or the absolute value of the change of the spindle velocity for the decision of presence or absence of slip.

A third embodiment of the controller of a spindle according to the present invention will be described with reference to FIG. 5.

Figure 2:
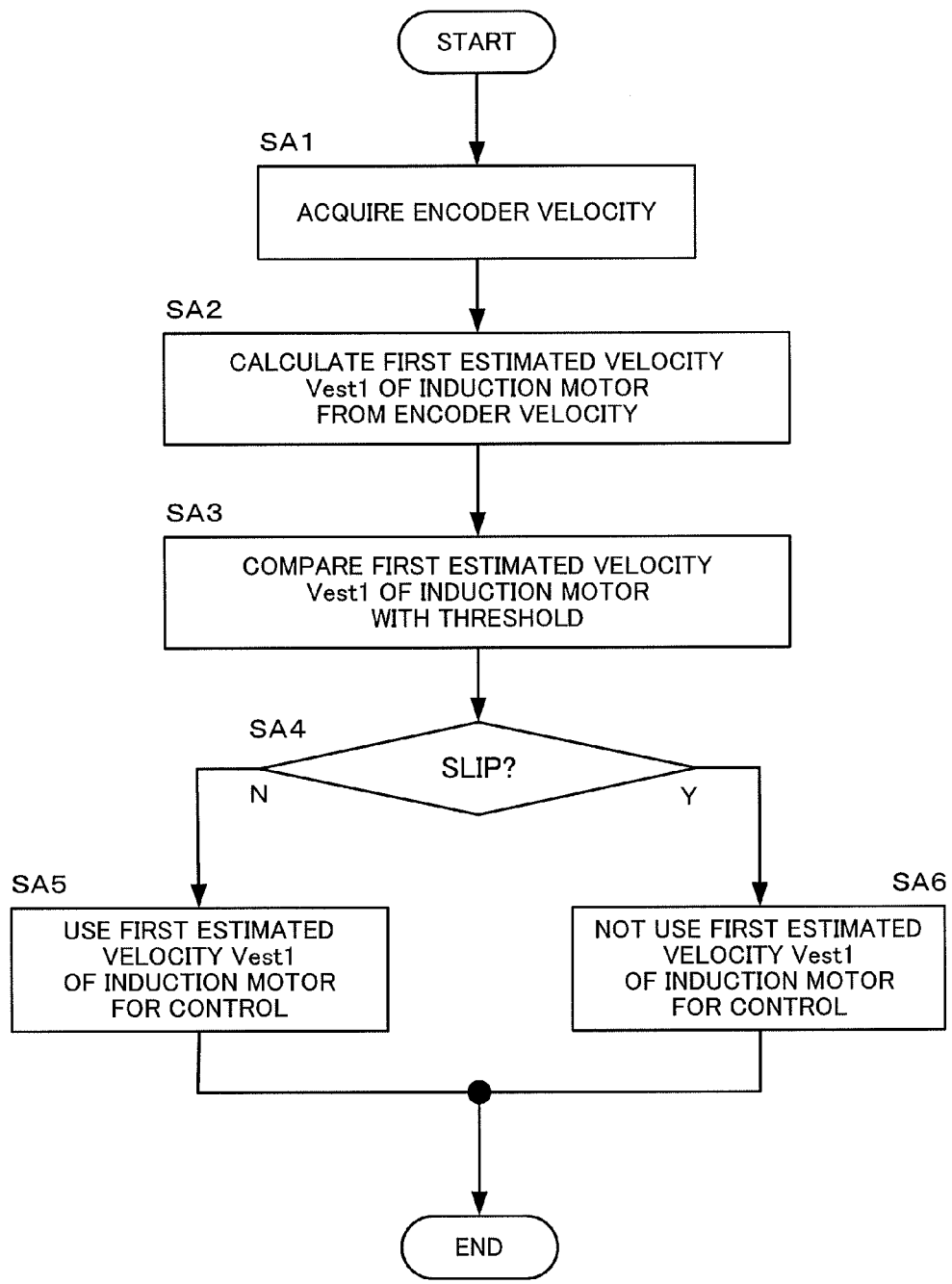
FIG. 2 is a flow chart illustrating an algorithm of control by the controller illustrated in FIG. 1.

This embodiment corresponds to a controller obtained by adding another motor velocity estimating unit 24 (second motor velocity estimating unit) to the first embodiment (FIG. 1). The second motor velocity estimating unit 24 estimates the velocity of the induction motor based on the actual current Ire flowing through the induction motor 2 detected by the current detector 14 and outputs the estimated velocity of the induction motor (second estimated velocity Vest2) to a slip detecting unit 22C (third slip detecting unit) and the velocity control unit 11.

The third slip detecting unit 22C decides whether or not slip has occurred by deciding whether or not the absolute value of the difference between the first estimated velocity Vest1 obtained by the first motor velocity estimating unit 21 and the second estimated velocity Vest2 obtained by the second motor velocity estimating unit 24 is larger than a predetermined value (third threshold).

An algorithm of the control by the controller illustrated in FIG. 5 will be described with reference to the flow chart of FIG. 6. The processing illustrated in this flow chart is performed every control cycle. The algorithm will be described according to respective steps as follows.

[Step SC1] The encoder (spindle) velocity is acquired. Specifically, the spindle velocity is acquired by counting the number of feedback pulses per control cycle.

[Step SC2] The first estimated velocity of the induction motor is calculated from the encoder (spindle) velocity acquired in Step SC1 by using the following formula:

First estimated velocity Vest1 of induction motor=encoder velocity×(reduction ratio between spindle and motor)

The reduction ratio between the spindle and the motor in the formula is stored in the controller as a parameter in advance.

[Step SC3] The estimated velocity Vest2 (second estimated velocity) of the induction motor is calculated based on the actual current Ire flowing through the induction motor. Since the method for calculating the estimated velocity of the induction motor based on the actual current Ire is conventionally known, detailed description thereof is not provided herein.

[Step SC4] The absolute value of the difference between the first estimated velocity Vest1 of the induction motor calculated in Step SC2 and the second estimated velocity Vest2 of the induction motor calculated in Step SC3 is compared with a predetermined value (third threshold).

[Step SC5] As a result of the comparison in Step SC4, when the absolute value of the difference between the second estimated velocity Vest2 and the first estimated velocity Vest1 is not larger than the third threshold, it is decided that the belt has not slipped, and the algorithm goes to Step SC6. On the other hand, when the absolute value of the difference between the second estimated velocity Vest2 and the first estimated velocity Vest1 is larger than the third threshold, it is decided that the belt has slipped and the algorithm goes to Step SC7.

[Step SC6] The first estimated velocity Vest1 of the induction motor calculated in Step SC2 is used for the control, and the processing in the present control cycle is completed.

[Step SC7] The first estimated velocity Vest1 of the induction motor calculated in Step SC2 is not used for the control, and the processing in the present control cycle is completed.

Figure 7:
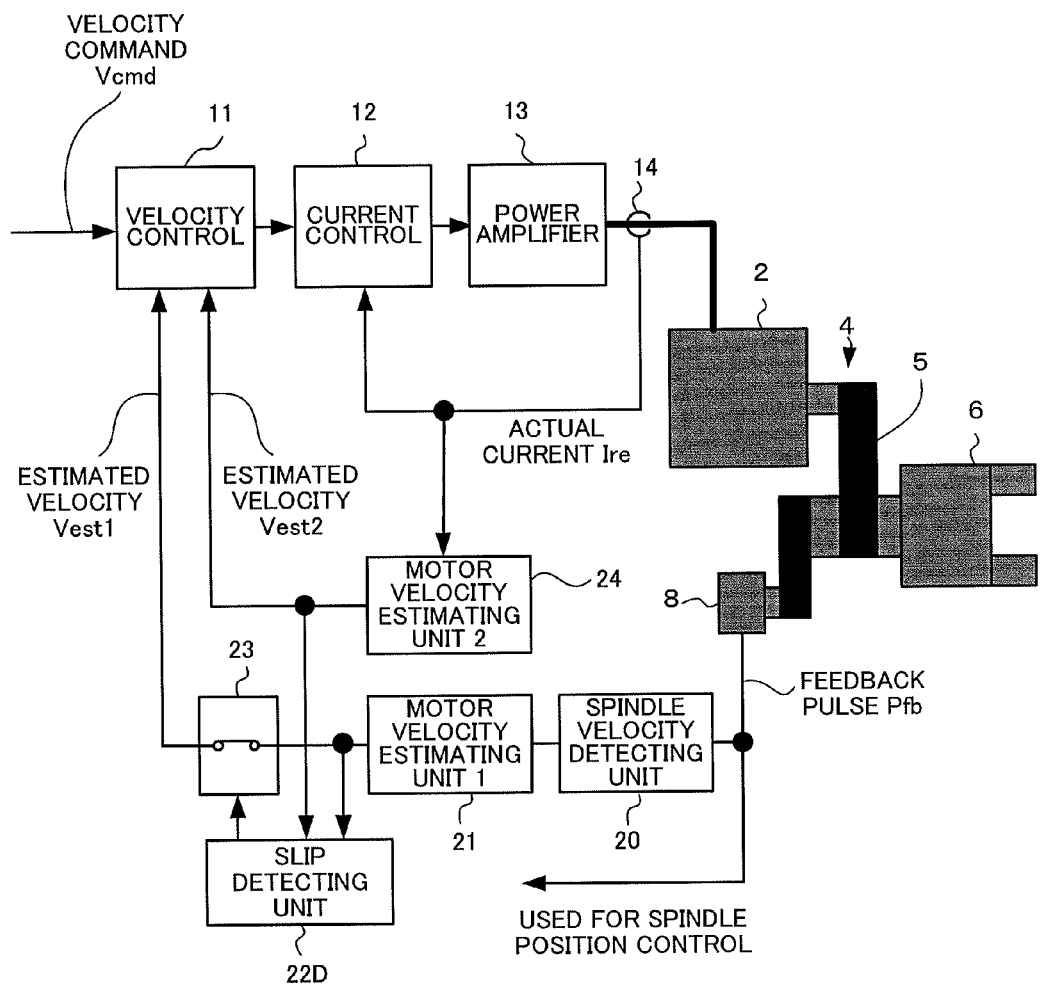
FIG. 7 is a drawing illustrating a fourth embodiment of the controller of a spindle according to the present invention.

A fourth embodiment of the controller of a spindle according to the present invention will be described with reference to FIG. 7.

This embodiment is different from the third embodiment (FIG. 5) in that a slip detecting unit 22D (fourth slip detecting unit) decides presence or absence of slip by deciding whether or not the change of the difference between the estimated velocities is larger than a predetermined value.

Figure 8:
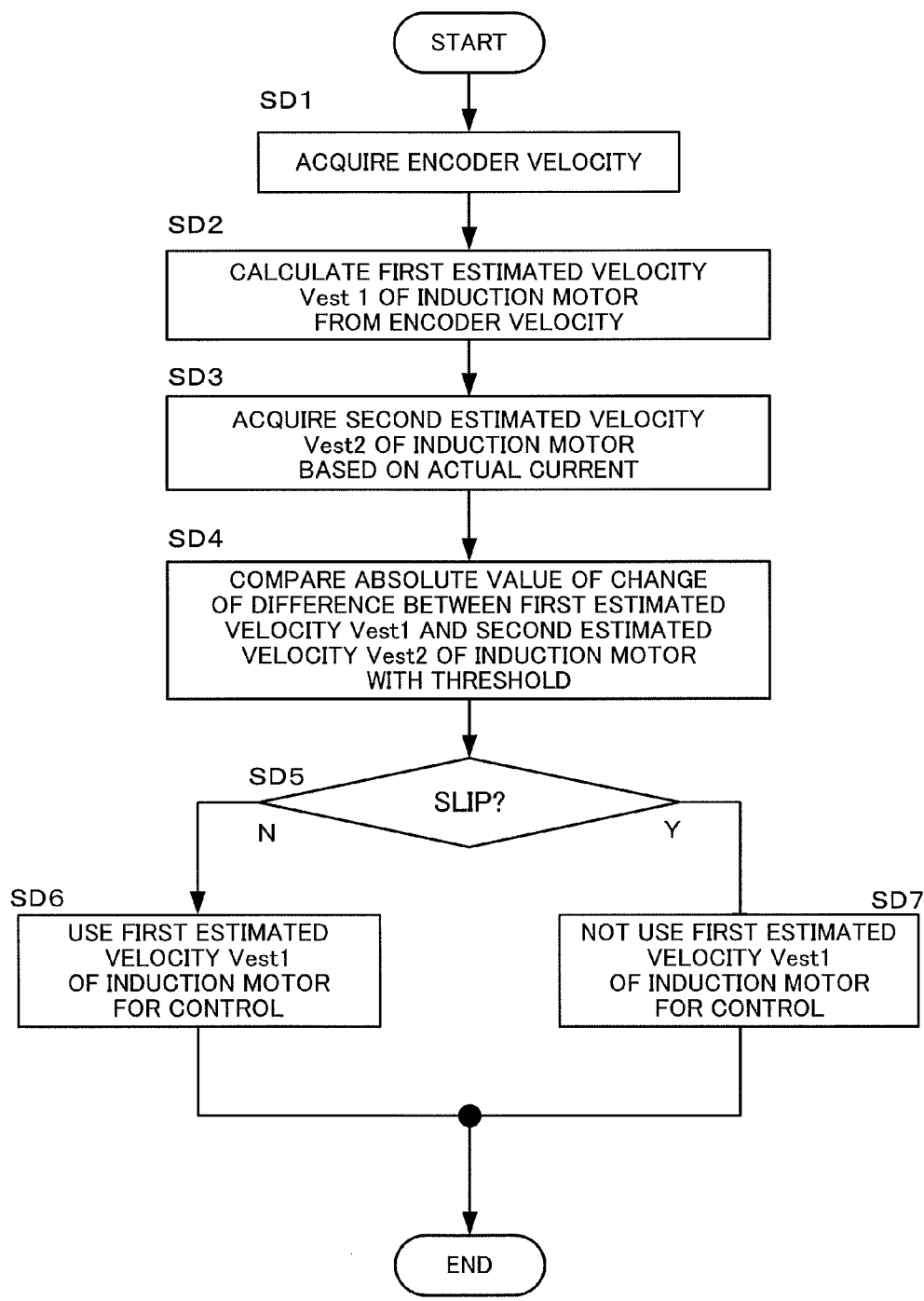
FIG. 8 is a flow chart illustrating an algorithm of control by the controller illustrated in FIG. 7.

An algorithm of the control by the controller illustrated in FIG. 7 will be described with reference to the flow chart of FIG. 8. The processing illustrated in this flow chart is performed every control cycle. The algorithm will be described according to respective steps as follows.

[Step SD1] The encoder (spindle) velocity is acquired. Specifically, the spindle velocity is acquired by counting the number of feedback pulses per control cycle.

[Step SD2] The first estimated velocity of the induction motor is calculated from the encoder (spindle) velocity acquired in Step SD1 by using the following formula:

First estimated velocity Vest1 of induction motor=encoder velocity×(reduction ratio between spindle and motor)

The reduction ratio between the spindle and the motor in the formula is stored in the controller as a parameter in advance.

[Step SD3] The estimated velocity Vest2 (second estimated velocity) of the induction motor is calculated based on the actual current Ire flowing through the induction motor. Since the method for calculating the estimated velocity of the induction motor based on the actual current Ire is conventionally known, detailed description thereof is not provided herein.

[Step SD4] The change of the difference between the first estimated velocity Vest1 of the induction motor calculated in Step SD2 and the second estimated velocity Vest2 of the induction motor calculated in Step SD3 (difference between the estimated velocities) is calculated, and the absolute value of the calculated change of the difference between the estimated velocities is compared with a predetermined value (fourth threshold). Here, the change of the difference between the first estimated velocity Vest1 and the second estimated velocity Vest2 (change of difference between the estimated velocities) can be calculated from the difference between the first estimated velocity Vest1 and the second estimated velocity Vest2 determined in the previous control cycle, and the difference between the first estimated velocity Vest1 and the second estimated velocity Vest2 determined in the present control cycle, for example.

[Step SD5] As a result of the comparison in Step SD4, when the absolute value of the change of the difference between the first estimated velocity Vest1 of the induction motor and the second estimated velocity Vest2 is not larger than the fourth threshold, it is decided that the belt has not slipped, and the algorithm goes to Step SD6. On the other hand, when the absolute value of the change of the difference between the first estimated velocity Vest1 and the second estimated velocity Vest2 is larger than the fourth threshold, it is decided that the belt has slipped and the algorithm goes to Step SD7.

[Step SD6] The first estimated velocity Vest1 of the induction motor calculated in Step SD2 is used for the control, and the processing in the present control cycle is completed.

[Step SD7] The first estimated velocity Vest1 of the induction motor calculated in Step SD2 is not used for the control, and the processing in the present control cycle is completed.

A fifth embodiment of the controller of a spindle according to the present invention will be described with reference to FIG. 9.

Figure 5:
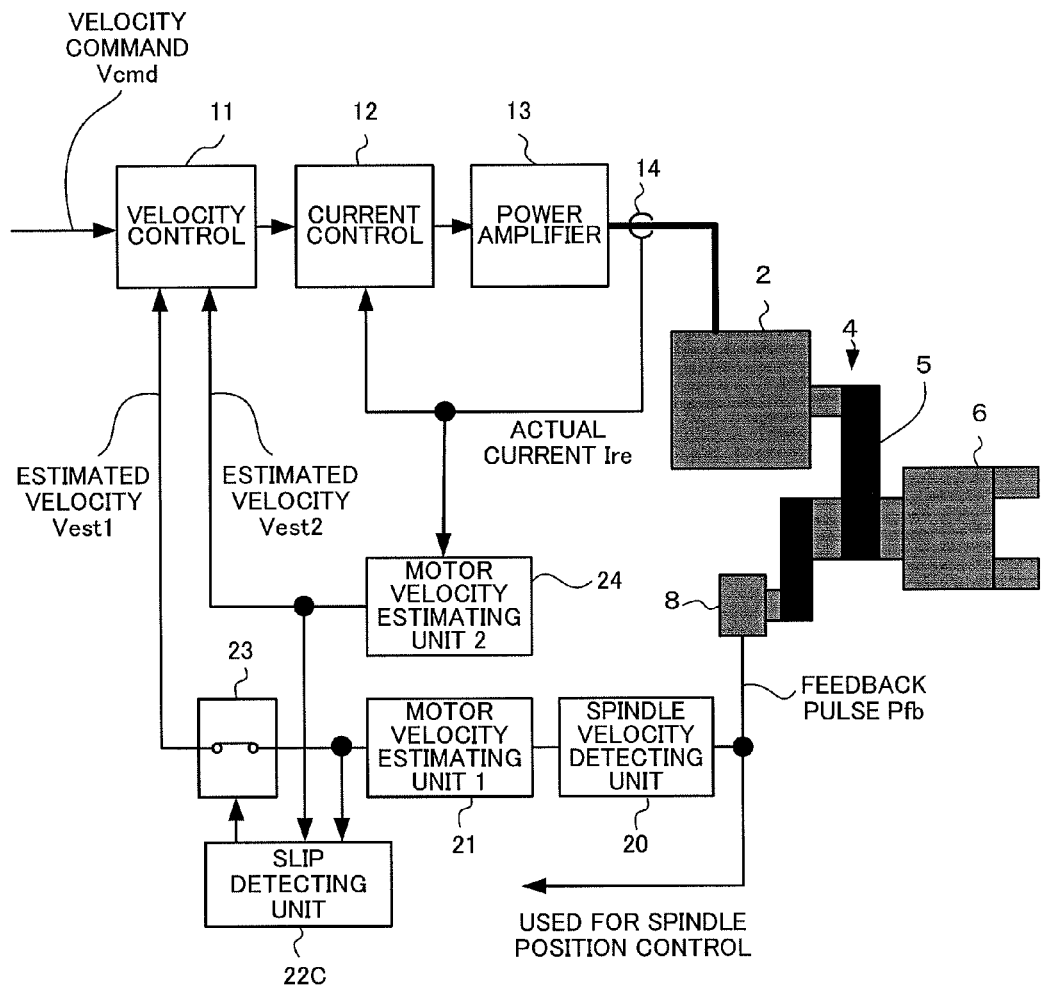
FIG. 5 is a drawing illustrating a third embodiment of the controller of a spindle according to the present invention.
Figure 9:
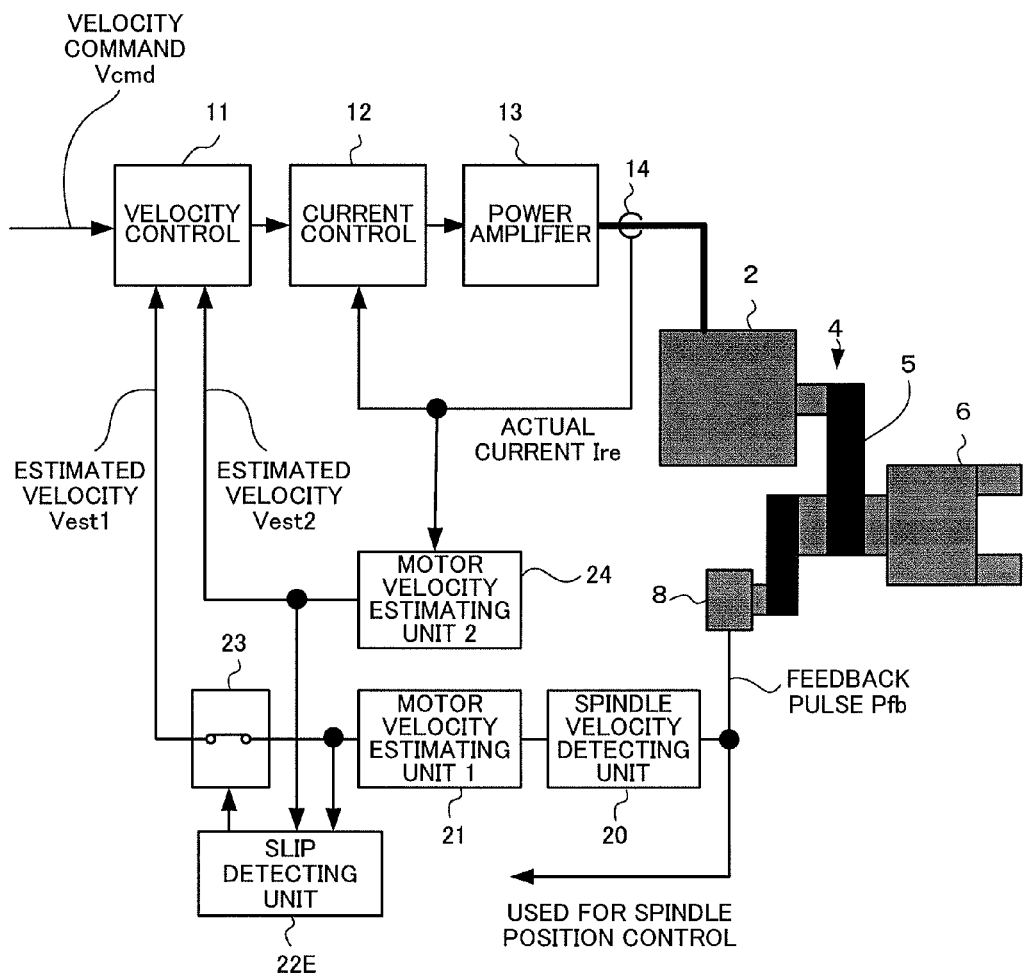
FIG. 9 is a drawing illustrating a fifth embodiment of the controller of a spindle according to the present invention.

In this embodiment the slip detecting unit 22C (third slip detecting unit) illustrated in FIG. 5 (third embodiment) is replaced with a slip detecting unit 22E (fifth slip detecting unit) illustrated in FIG. 9 to decide presence or absence of slip by deciding whether or not the ratio between the first estimated velocity Vest1 obtained by the first motor velocity estimating unit 21 and the second estimated velocity Vest2 obtained by the second motor velocity estimating unit 24, ratio between the estimated velocities, is larger than a predetermined value (fifth threshold).

Figure 10:
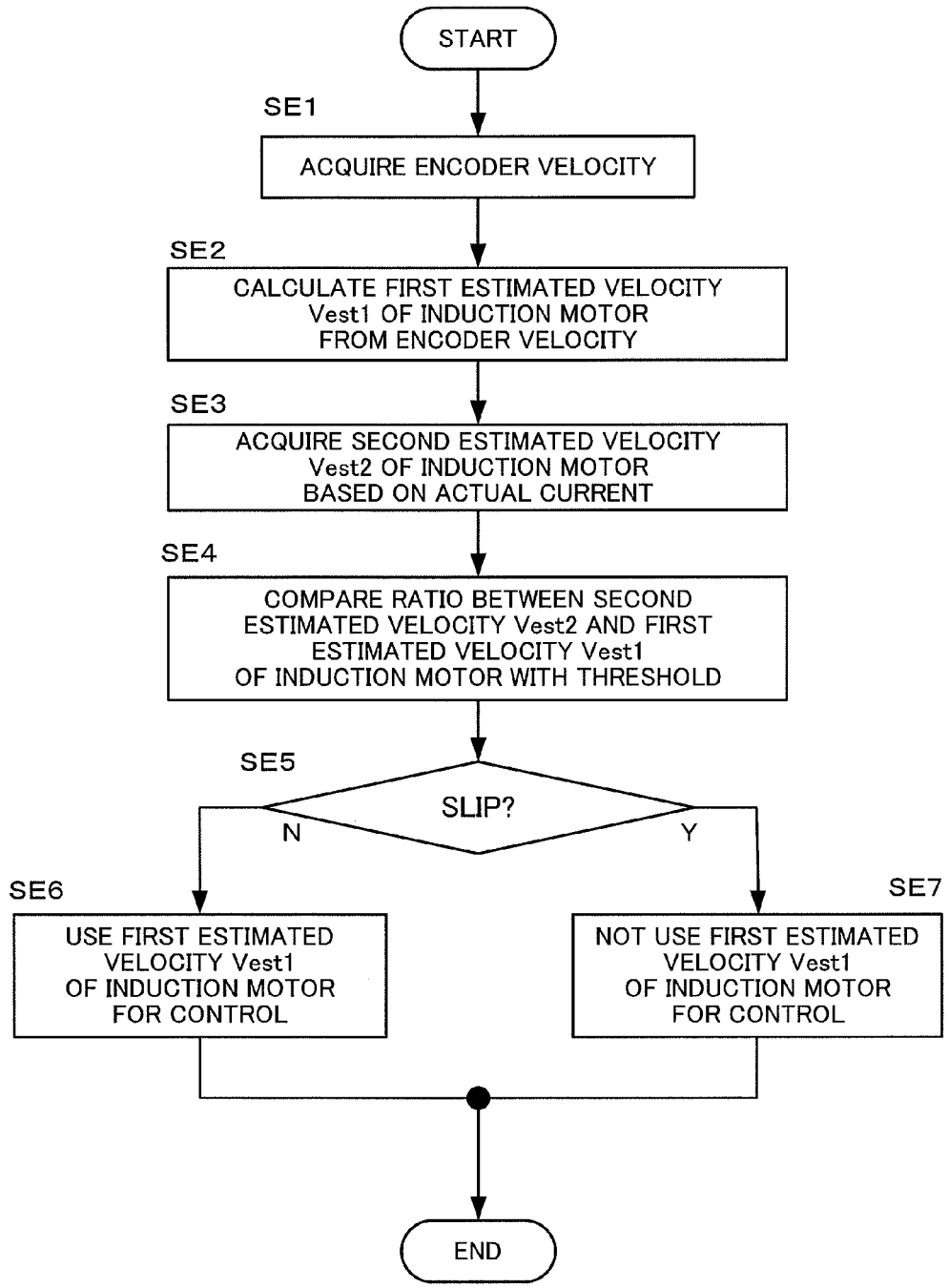
FIG. 10 is a flow chart illustrating an algorithm of control by the controller illustrated in FIG. 9.

An algorithm of the control by the controller illustrated in FIG. 9 will be described with reference to the flow chart of FIG. 10. The processing illustrated in this flow chart is performed every control cycle. The algorithm will be described according to respective steps as follows.

[Step SE1] The encoder (spindle) velocity is acquired. Specifically, the spindle velocity is acquired by counting the number of feedback pulses per control cycle.

[Step SE2] The first estimated velocity of the induction motor is calculated from the encoder (spindle) velocity acquired in Step SE1 by using the following formula:

First estimated velocity Vest1 of induction
motor=encoder velocity×(reduction ratio
between spindle and motor)

The reduction ratio between the spindle and the motor in the formula is stored in the controller as a parameter in advance.

[Step SE3] The estimated velocity Vest2 (second estimated velocity) of the induction motor is calculated based on the actual current Ire flowing through the induction motor. Since the method for calculating the estimated velocity of the induction motor based on the actual current Ire is conventionally known, detailed description thereof is not provided herein.

[Step SE4] The ratio between the second estimated velocity Vest2 of the induction motor calculated in Step SE3 and the first estimated velocity Vest1 of the induction motor calculated in Step SE2 (Vest2/Vest1) is compared with a predetermined value (fifth threshold).

[Step SE5] As a result of the comparison in Step SE4, when the ratio between the second estimated velocity Vest2 and the first estimated velocity Vest1 (Vest2/Vest1) is not larger than the fifth threshold, it is decided that the belt has not slipped, and the algorithm goes to Step SE6. On the other hand, when the ratio between the second estimated velocity Vest2 and the first estimated velocity Vest1 (Vest2/Vest1) is larger than the fifth threshold, it is decided that the belt has slipped and the algorithm goes to Step SE7.

[Step SE6] The first estimated velocity Vest1 of the induction motor calculated in Step SE2 is used for the control, and the processing in the present control cycle is completed.

[Step SE7] The first estimated velocity Vest1 of the induction motor calculated in Step SE2 is not used for the control, and the processing in the present control cycle is completed.

A sixth embodiment of the controller of a spindle according to the present invention will be described with reference to FIGS. 11 and 12.

Figure 11:
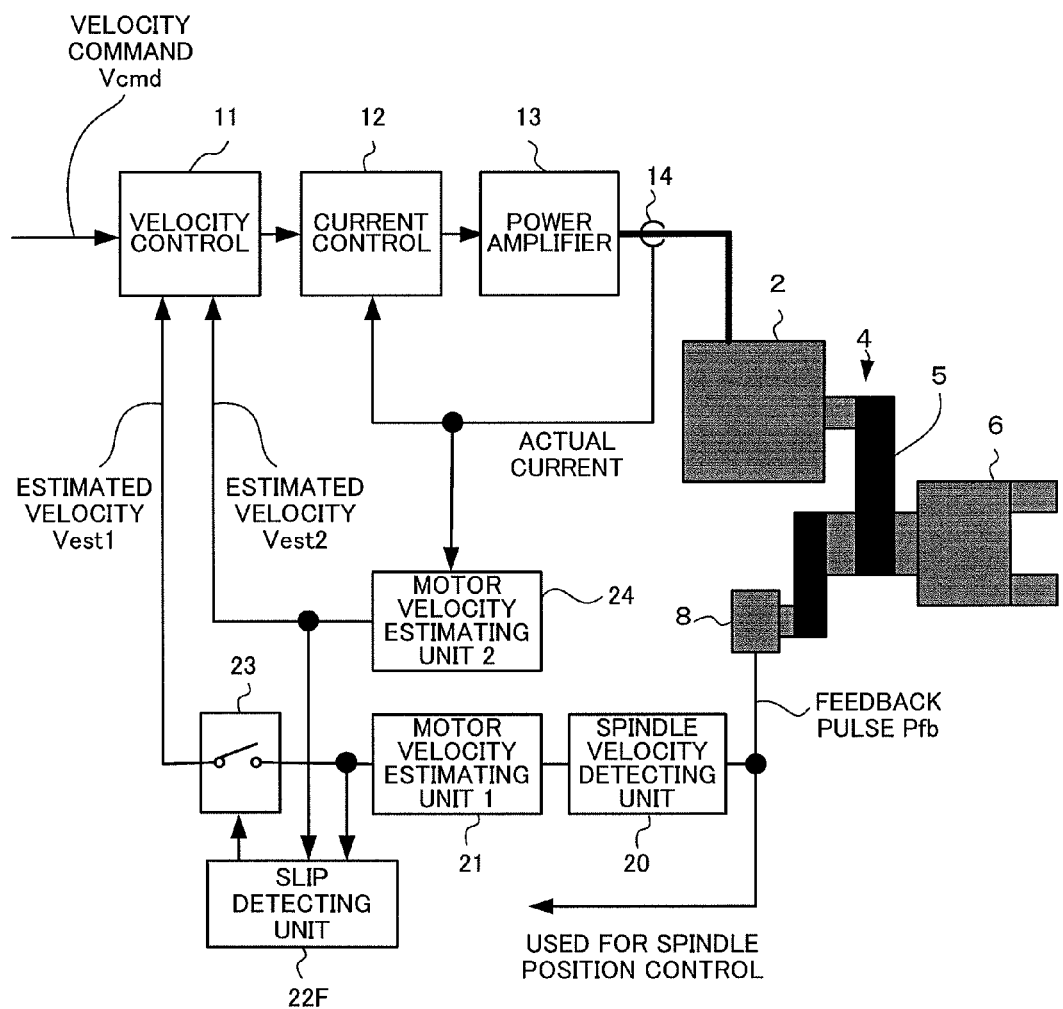
FIG. 11 is a drawing illustrating a sixth embodiment of the controller of a spindle according to the present invention.
Figure 12:
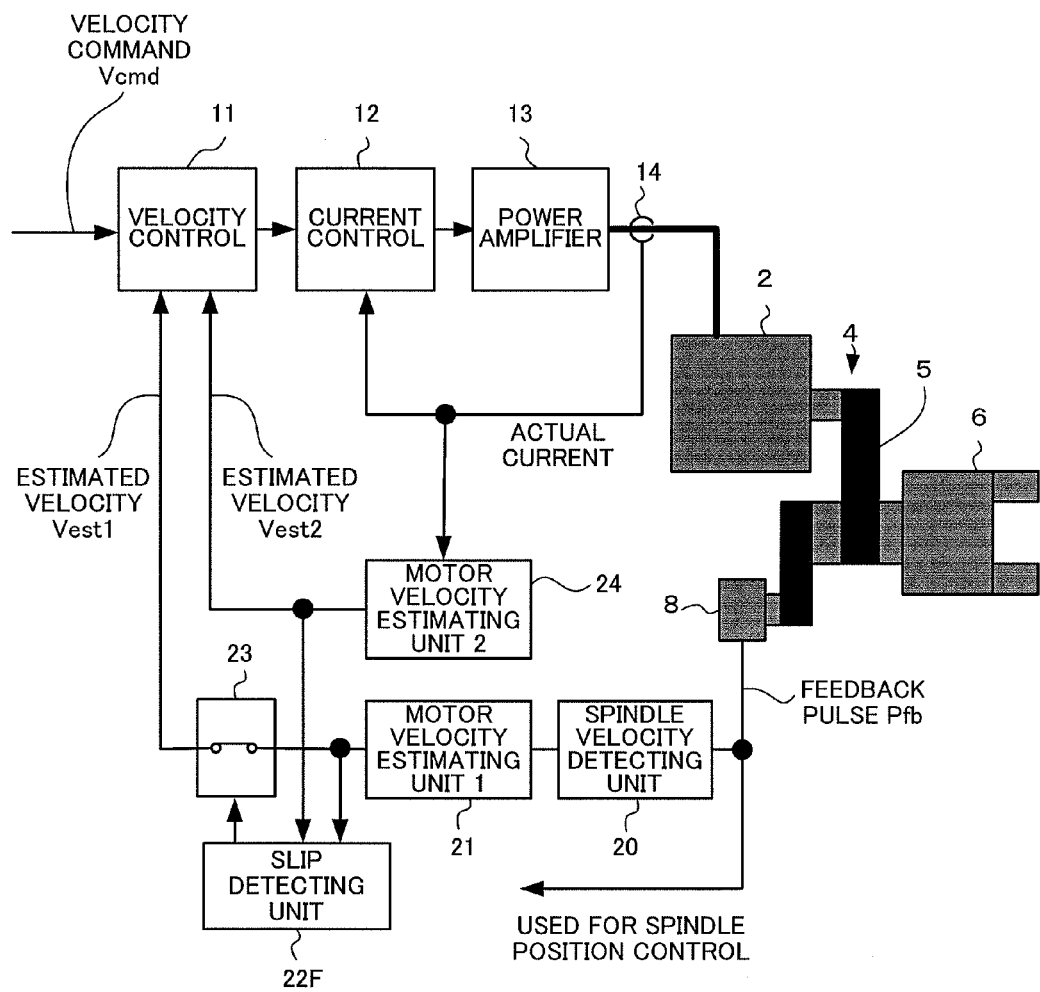
FIG. 12 is a drawing illustrating the sixth embodiment of the controller of a spindle according to the present invention.

In this embodiment, the slip detecting unit 22C (third slip detecting unit) illustrated in FIG. 5 (third embodiment) is replaced with a slip detecting unit 22F (sixth slip detecting unit) illustrated in FIGS. 11 and 12 to control the switch unit 23 so that the first estimated velocity Vest1 is input from the first motor velocity estimating unit 21 to the velocity control unit 11 when a predetermined period of time lapses after it is detected that the belt 5 has not slipped.

An algorithm of the control by the controller illustrated in FIGS. 11 and 12 will be described with reference to the flow chart of FIG. 13. The processing illustrated in this flow chart is performed every control cycle. The algorithm will be described according to respective steps as follows.

[Step SF1] The encoder (spindle) velocity is acquired. Specifically, the spindle velocity is acquired by counting the number of feedback pulses per control cycle.

[Step SF2] The first estimated velocity of the induction motor is calculated from the encoder (spindle) velocity acquired in Step SF1 by using the following formula:

First estimated velocity Vest1 of induction
motor=encoder velocity×(reduction ratio
between spindle and motor)

The reduction ratio between the spindle and the motor in the formula is stored in the controller as a parameter in advance.

[Step SF3] The estimated velocity Vest2 (second estimated velocity) of the induction motor is calculated based on the actual current Ire flowing through the induction motor. Since the method for calculating the estimated velocity of the induction motor based on the actual current Ire is conventionally known, detailed description thereof is not provided herein.

[Step SF4] The absolute value of the difference between the first estimated velocity Vest1 of the induction motor calculated in Step SF2 and the second estimated velocity Vest2 of the induction motor calculated in Step SF3 is compared with a predetermined value (third threshold).

[Step SF5] As a result of the comparison in Step SF4, when the absolute value of the difference between the second estimated velocity Vest2 and the first estimated velocity Vest1 is not larger than the third threshold, it is decided that the belt has not slipped, and the algorithm goes to Step SF6. On the other hand, when the absolute value of the difference between the second estimated velocity Vest2 and the first estimated velocity Vest1 is larger than the third threshold, it is decided that the belt has slipped and the algorithm goes to Step SF8.

[Step SF6] Whether or not slip occurred in a past predetermined period of time (n seconds) is decided, and when it is decided that slip did not occur, the algorithm goes to Step SF7. On the other hand, when it is decided that slip occurred, the algorithm goes to Step SF8. The decision in Step SF6 on whether or not slip occurred in the past n seconds can be carried out by using a timer function.

[Step SF7] The first estimated velocity Vest1 of the induction motor calculated in Step SF2 is used for the control (see FIG. 12), and the processing in the present control cycle is completed.

[Step SF8] The first estimated velocity Vest1 of the induction motor calculated in Step SF2 is not used for the control (see FIG. 11), and the processing in the present control cycle is completed.

Figure 6:
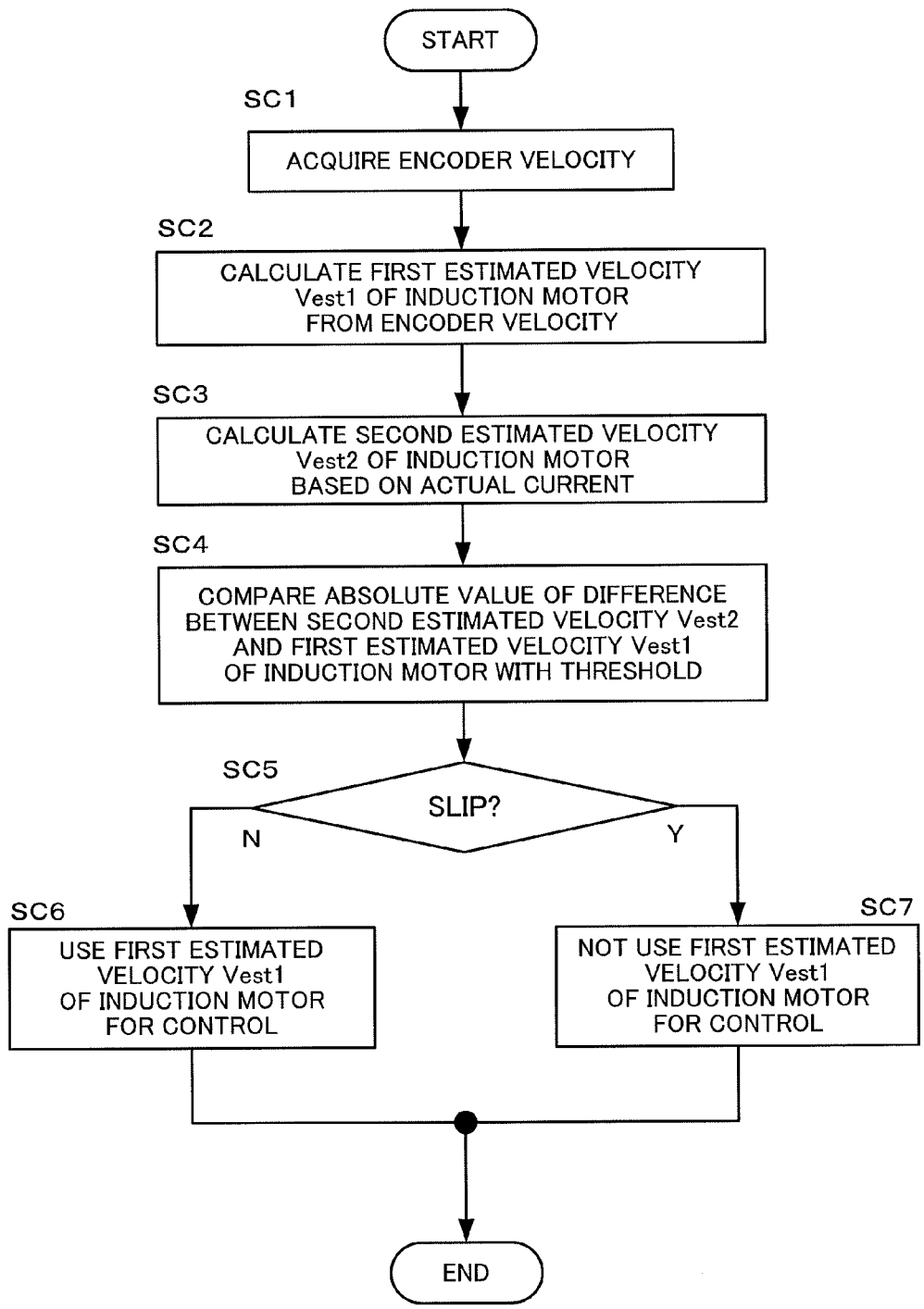
FIG. 6 is a flow chart illustrating an algorithm of control by the controller illustrated in FIG. 5.
Figure 13:
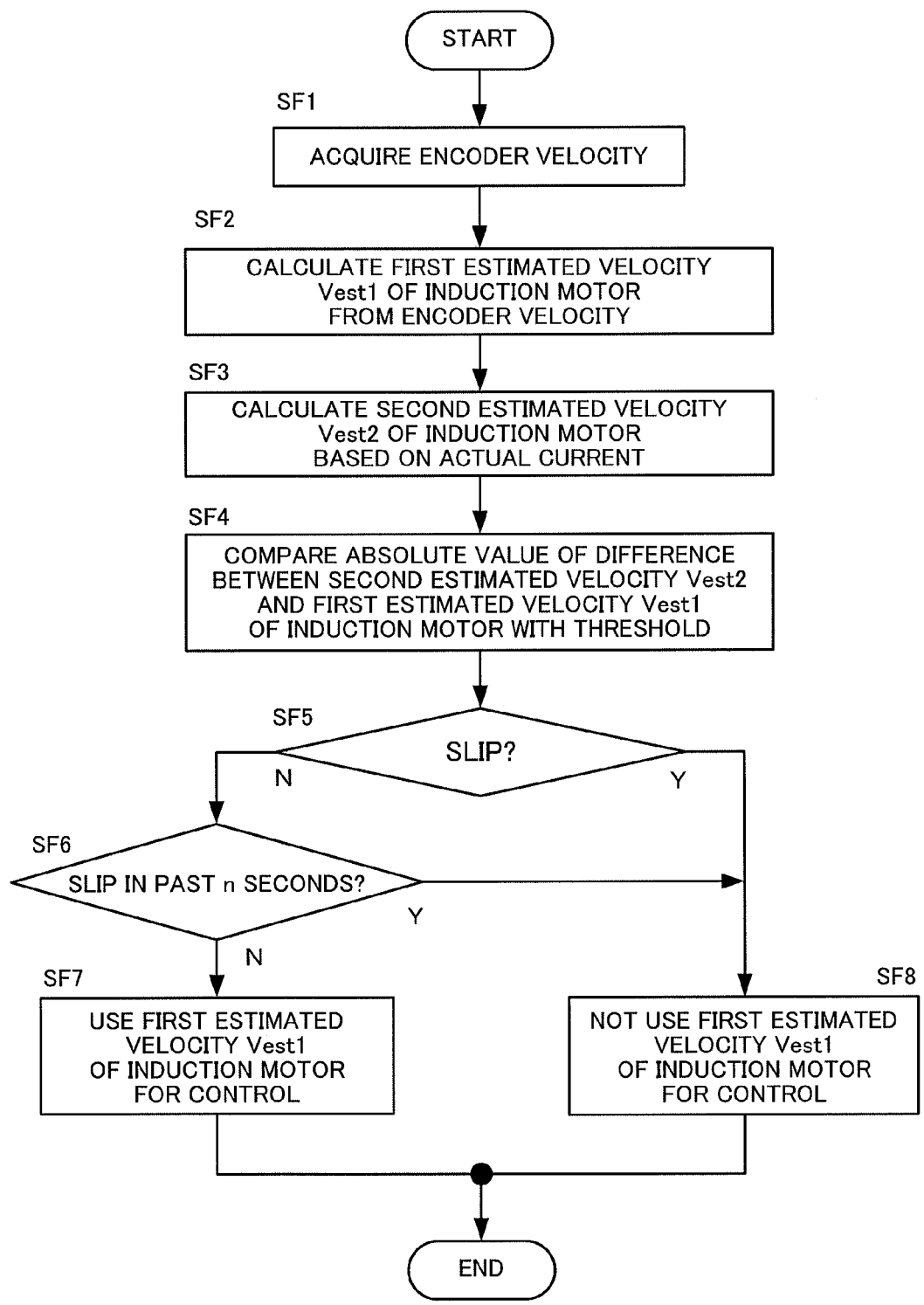
FIG. 13 is a flow chart illustrating an algorithm of control by the controller illustrated in FIGS. 11 and 12.

Here, the method of the decision on presence or absence of slip in Step SF5 in the flow chart of FIG. 13 is the same as the method of the decision on presence or absence of slip in Step SC5 in the flow chart of FIG. 6 (third embodiment), but any of the methods of the decision on presence or absence of slip in the other embodiments can be adopted.

Figure 14:
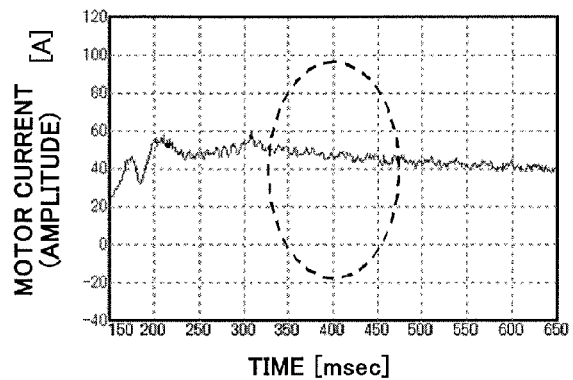
FIG. 14 is a drawing illustrating a motor current of an induction motor that is controlled and driven by the controller according to the present invention.
Figure 15:
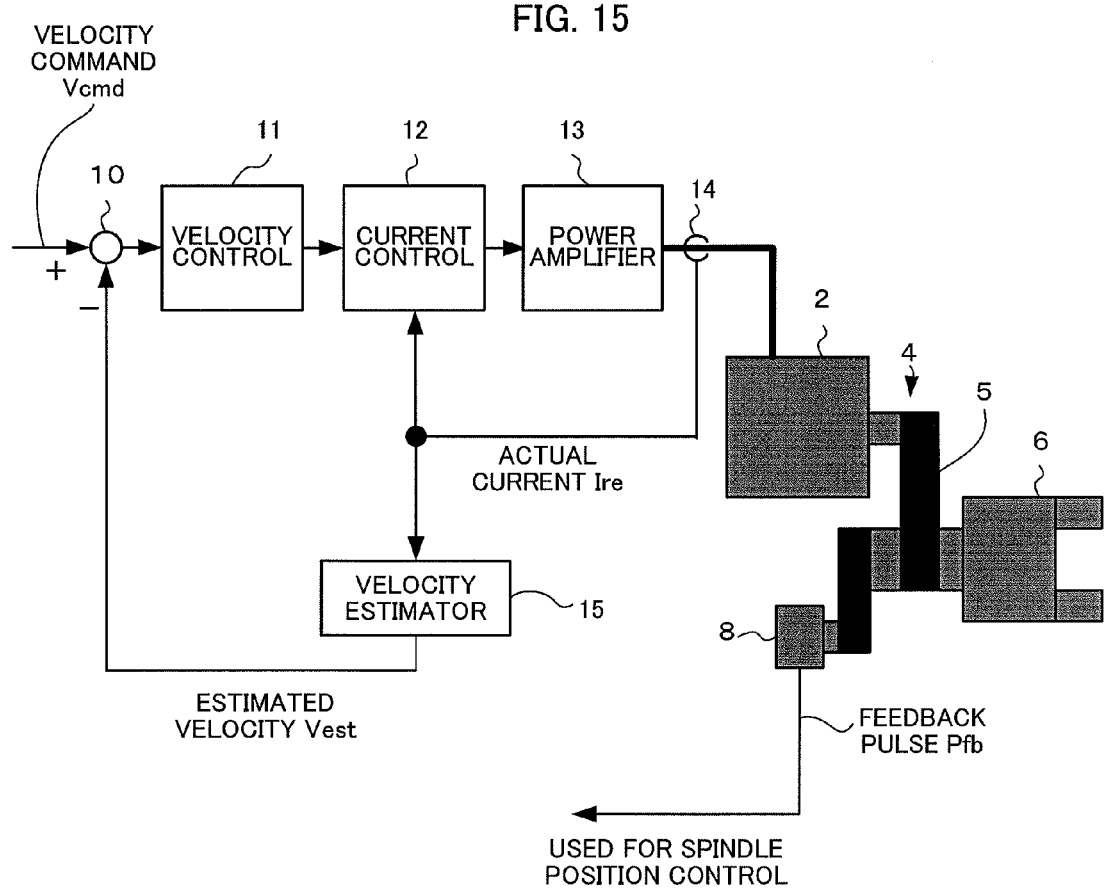
FIG. 15 is a schematic block diagram illustrating a spindle to which an induction motor having no velocity detection sensor attached thereto (sensorless) is applied.
Figure 16:
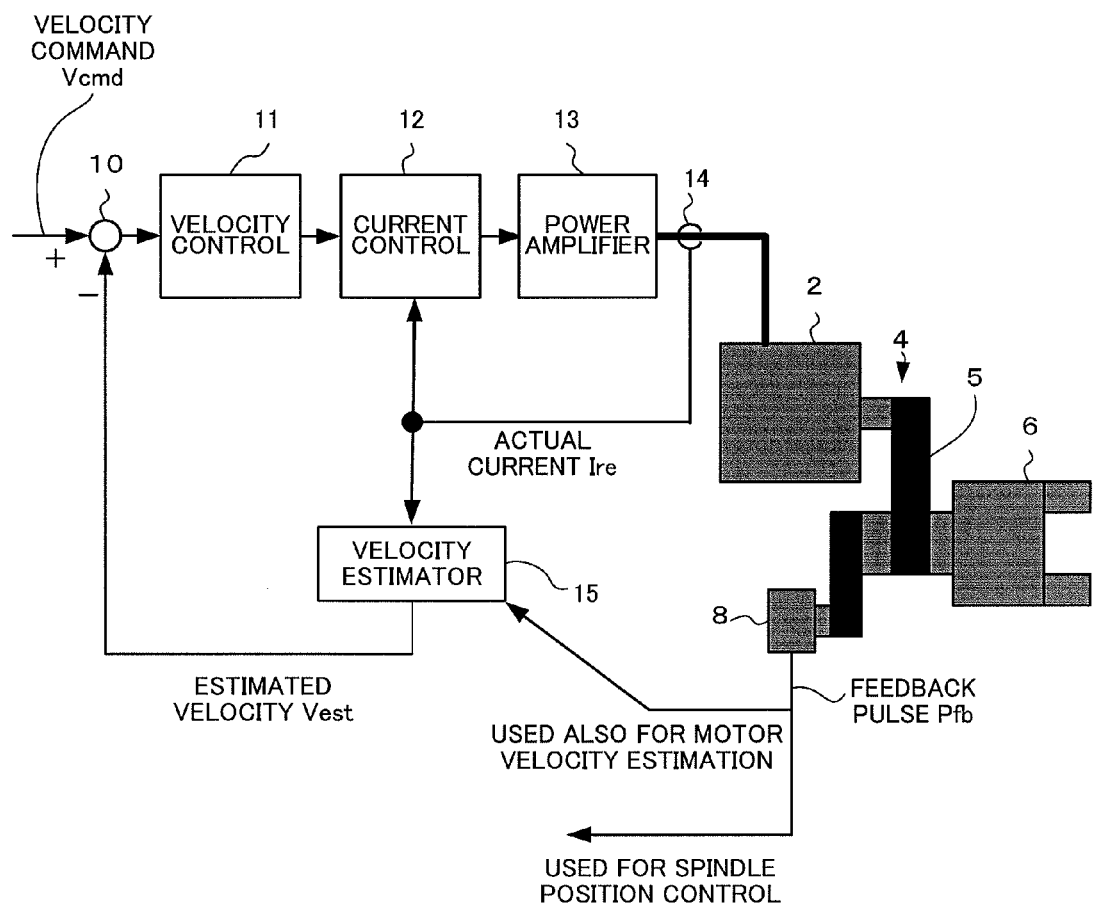
FIG. 16 is a schematic block diagram illustrating a spindle to which the sensorless induction motor is applied and for which a feedback pulse from an encoder is utilized also for motor velocity control.
Figure 17:
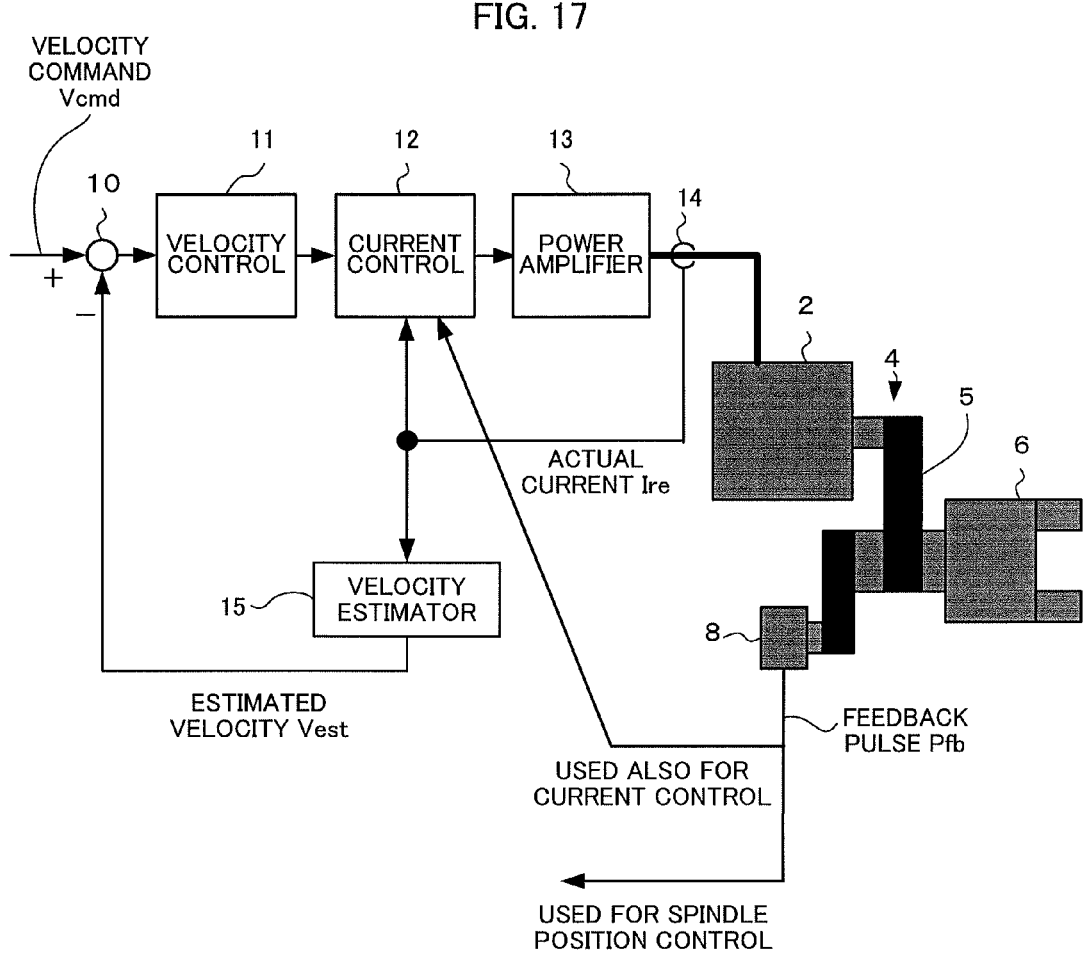
FIG. 17 is a schematic block diagram illustrating a spindle to which the sensorless induction motor is applied and for which the feedback pulse from an encoder is utilized also for current control.
Figure 18A:
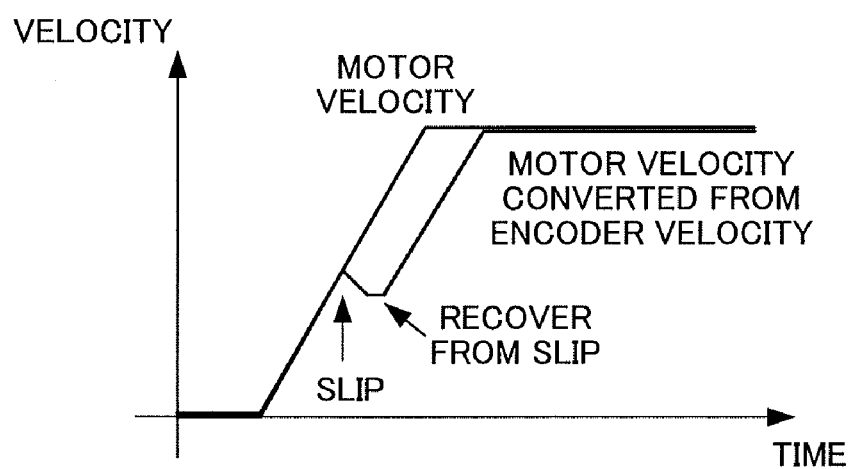
FIG. 18A and FIG. 18B are drawings illustrating behavior of the motor velocity converted from an encoder velocity and a motor velocity when slip occurs.
Figure 18B:
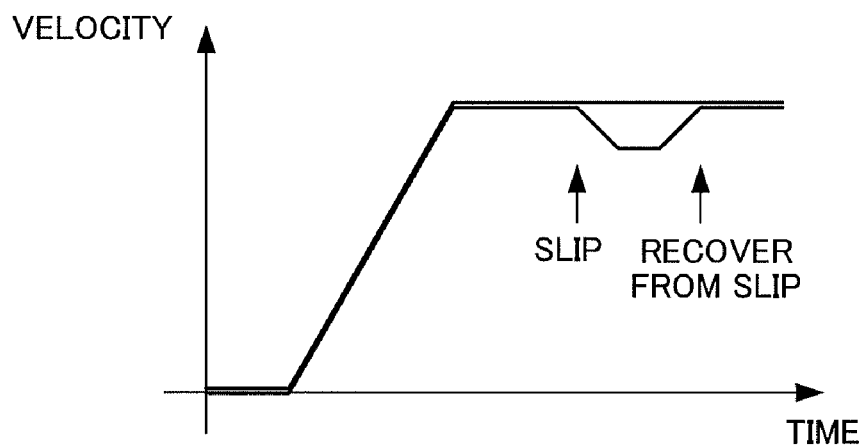
Figure 19:
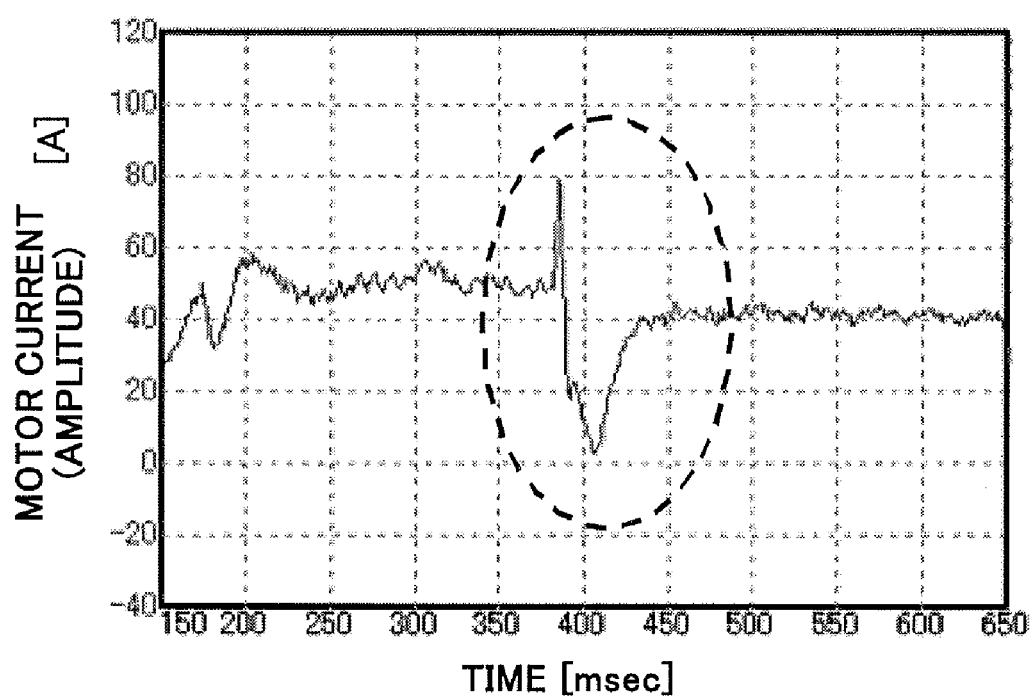
FIG. 19 is a drawing illustrating that sudden change of a torque command causes the motor current to be excessive.

FIG. 14 is a drawing illustrating a motor current of an induction motor that is controlled and driven by the controller according to the present invention. According to the present invention, as illustrated in FIG. 14, there will be no significant change in the velocity feedback to be used for the velocity control even when the belt 5 slips, and as a result, it is possible to avoid a phenomenon of the motor current (actual current Ire) becoming excessive, which has occurred in conventional methods. It is thereby possible to avoid occurrence of an abnormal current in the current control unit 12, mechanical shock by discontinuous motor output torque, and defective machining.

The invention claimed is:

1. A controller for controlling a spindle connected to an induction motor via a belt by controlling the rotational velocity of the induction motor, the spindle having an encoder attached thereto for detecting the position of the spindle, the controller comprising:

a spindle velocity detecting unit for detecting a spindle velocity from the number of feedback pulses of the encoder within a predetermined period of time;

a first motor velocity estimating unit for obtaining a first estimated motor velocity of the induction motor from the spindle velocity detected by the spindle velocity detecting unit and a reduction ratio between the spindle and the induction motor;

a motor velocity control unit for controlling the induction motor based on a velocity command given to the induction motor and the first estimated motor velocity obtained by the first motor velocity estimating unit;

a slip detecting unit for detecting occurrence of slip of the belt based on the first estimated motor velocity obtained by the first motor velocity estimating unit or the spindle velocity detected by the spindle velocity detecting unit; and a switch unit for controlling input of the first estimated motor velocity to the motor velocity control unit based on a result of the belt slip detection from the slip detecting unit, wherein the switch unit is controlled so that the first estimated motor velocity will not be used for the control of the induction motor when slip of the belt is detected by the slip detecting unit, further comprising a second motor velocity estimating unit for calculating a second estimated motor velocity from the velocity command of the induction motor and a motor current flowing through the induction motor, wherein the slip detecting unit recognizes occurrence of slip of the belt when the difference between the first estimated motor velocity and the second estimated motor velocity exceeds a second predetermined value.

2. The controller of a spindle according to claim 1, wherein the slip detecting unit comprises decision means for deciding whether or not slip occurred within a past predetermined period of time to control the switch unit so that the first estimated motor velocity will not be used for the control of the induction motor when the decision means decides that slip occurred within the past predetermined period of time even if the slip detecting unit does not detect occurrence of slip.

3. A controller for controlling a spindle connected to an induction motor via a belt by controlling the rotational velocity of the induction motor, the spindle having an encoder attached thereto for detecting the position of the spindle, the controller comprising:

a spindle velocity detecting unit for detecting a spindle velocity from the number of feedback pulses of the encoder within a predetermined period of time;

a first motor velocity estimating unit for obtaining a first estimated motor velocity of the induction motor from the spindle velocity detected by the spindle velocity detecting unit and a reduction ratio between the spindle and the induction motor;

a motor velocity control unit for controlling the induction motor based on a velocity command given to the induction motor and the first estimated motor velocity obtained by the first motor velocity estimating unit;

a slip detecting unit for detecting occurrence of slip of the belt based on the first estimated motor velocity obtained by the first motor velocity estimating unit or the spindle velocity detected by the spindle velocity detecting unit; and a switch unit for controlling input of the first estimated motor velocity to the motor velocity control unit based on a result of the belt slip detection from the slip detecting unit, wherein the switch unit is controlled so that the first estimated motor velocity will not be used for the control of the induction motor when slip of the belt is detected by the slip detecting unit, further comprising the second motor velocity estimating unit for calculating a second estimated motor velocity from the velocity command of the induction motor and a motor current flowing through the induction motor, wherein the slip detecting unit recognizes occurrence of slip of the belt when the change of the difference between the first estimated motor velocity and the second estimated motor velocity exceeds a third predetermined value.

4. The controller of a spindle according to claim 3, wherein the slip detecting unit comprises decision means for deciding whether or not slip occurred within a past predetermined period of time to control the switch unit so that the first estimated motor velocity will not be used for the control of the induction motor when the decision means decides that slip occurred within the past predetermined period of time even if the slip detecting unit does not detect occurrence of slip.

5. A controller for controlling a spindle connected to an induction motor via a belt by controlling the rotational velocity of the induction motor, the spindle having an encoder attached thereto for detecting the position of the spindle, the controller comprising:

a spindle velocity detecting unit for detecting a spindle velocity from the number of feedback pulses of the encoder within a predetermined period of time;

a first motor velocity estimating unit for obtaining a first estimated motor velocity of the induction motor from the spindle velocity detected by the spindle velocity detecting unit and a reduction ratio between the spindle and the induction motor;

a motor velocity control unit for controlling the induction motor based on a velocity command given to the induction motor and the first estimated motor velocity obtained by the first motor velocity estimating unit;

a slip detecting unit for detecting occurrence of slip of the belt based on the first estimated motor velocity obtained by the first motor velocity estimating unit or the spindle velocity detected by the spindle velocity detecting unit; and a switch unit for controlling input of the first estimated motor velocity to the motor velocity control unit based on a result of the belt slip detection from the slip detecting unit, wherein the switch unit is controlled so that the first estimated motor velocity will not be used for the control of the induction motor when slip of the belt is detected by the slip detecting unit, further comprising a second motor velocity estimating unit for calculating a second estimated motor velocity from the velocity command of the induction motor and the motor current flowing through the induction motor, wherein the slip detecting unit recognizes occurrence of slip of the belt when a ratio between the second estimated motor velocity and the first estimated motor velocity exceeds a forth predetermined value.

6. The controller of a spindle according to claim 5, wherein the slip detecting unit comprises decision means for deciding whether or not slip occurred within a past predetermined period of time to control the switch unit so that the first estimated motor velocity will not be used for the control of the induction motor when the decision means decides that slip occurred within the past predetermined period of time even if the slip detecting unit does not detect occurrence of slip.

* * * * *